(12) United States Patent
Baginski

(10) Patent No.: US 7,086,659 B2
(45) Date of Patent: Aug. 8, 2006

(54) TRAILER LINE ROUTING

(75) Inventor: Frank T. Baginski, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 11/111,189

(22) Filed: Apr. 21, 2005

(65) Prior Publication Data

US 2005/0236807 A1   Oct. 27, 2005

Related U.S. Application Data

(62) Division of application No. 10/373,335, filed on Feb. 24, 2003, now Pat. No. 6,902,180.

(51) Int. Cl.
*B60D 1/62* (2006.01)
(52) U.S. Cl. .......................................... 280/420; 248/58
(58) Field of Classification Search ................ 280/420, 280/421, 422; 248/49, 58
See application file for complete search history.

(56) References Cited

U.S. PATENT DOCUMENTS

| | | |
|---|---|---|
| 2,554,176 A | 5/1951 | Edwards |
| 2,733,033 A | 1/1956 | Gunderson |
| 2,948,450 A | 8/1960 | Dobrikin |
| 2,978,217 A | 4/1961 | Gunderson |
| 2,984,445 A | 5/1961 | Dorbrikin |
| 3,420,546 A | 1/1969 | Jasovsky |
| 3,650,545 A | 3/1972 | Freed |
| 3,781,037 A | 12/1973 | Czajkowski |
| 3,915,476 A | 10/1975 | Burkle |
| 4,076,272 A | 2/1978 | Penton |
| 4,358,082 A | 11/1982 | Reeves |
| 4,366,965 A | 1/1983 | Rhodes |
| 4,624,472 A | 11/1986 | Stuart et al. |
| 5,080,594 A | 1/1992 | Swinford |
| 5,143,392 A | 9/1992 | Collins |
| 5,239,848 A | 8/1993 | Nichos, Jr. |
| 5,516,136 A | 5/1996 | Matthews et al. |
| 5,607,221 A | 3/1997 | Justus |
| 5,660,408 A | 8/1997 | Johnson |

FOREIGN PATENT DOCUMENTS

GB   2240311   7/1991

*Primary Examiner*—Kevin Hurley
(74) *Attorney, Agent, or Firm*—Martin Farrell

(57) ABSTRACT

A system for routing an elongated line of an over the highway tractor having a connector for powering a component of a trailer. An elongated line, such as an electrical cable or an air hose, has a first mating connector that mates with a connector on the tractor that provides access to a source of air under pressure or electrical energy. The elongated line also includes a second mating connector that mates with a connector on a trailer. First and second releasable hooks are connected to the elongated line along the length of the line. The first and second hooks are secured to mounting points on the tractor to properly route the cable when the second connector is connected to the trailer and when the second connector is not connected to the trailer.

8 Claims, 6 Drawing Sheets

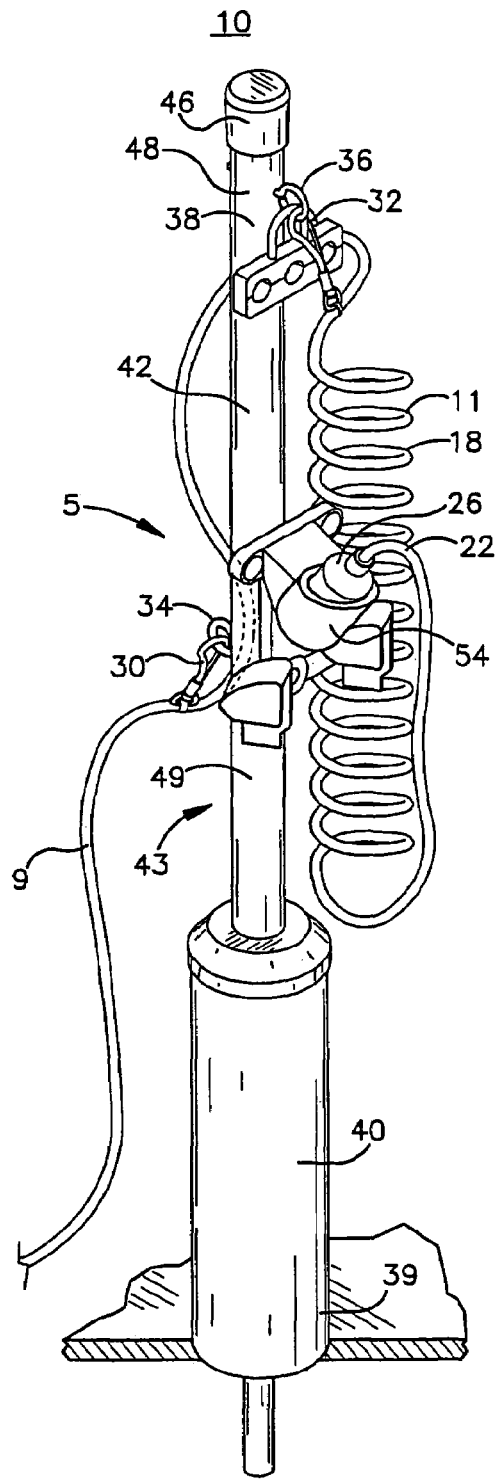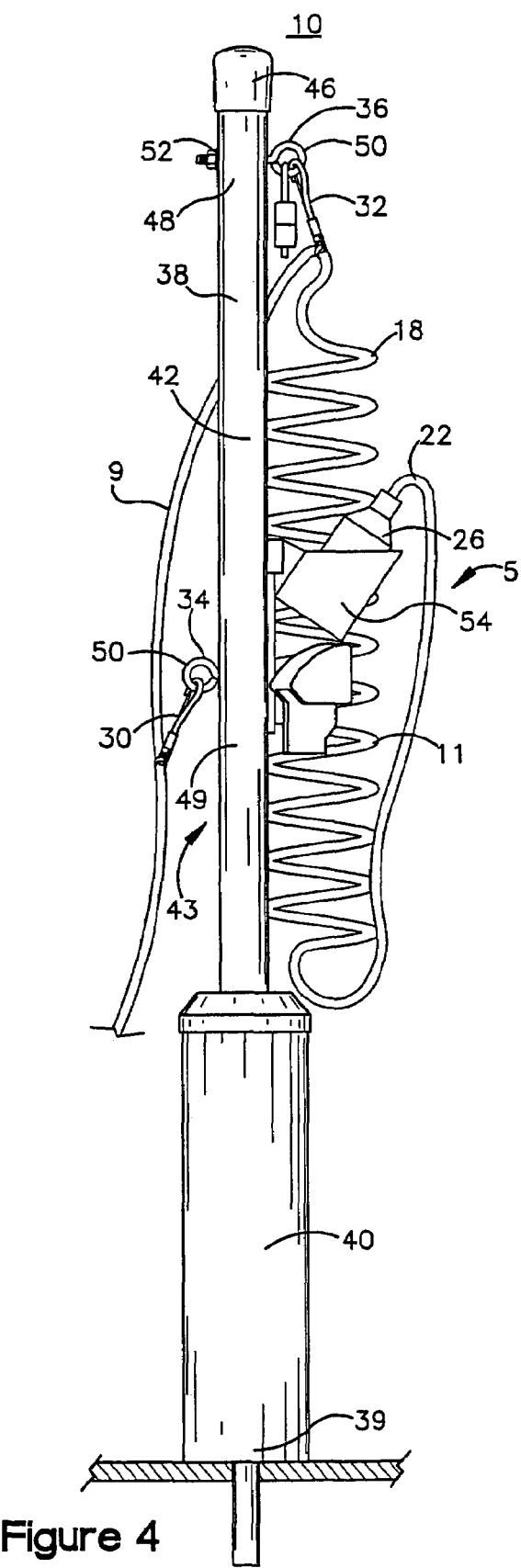
Figure 3
Figure 4

TRAILER LINE ROUTING

This application is a divisional of application No. 10/373,335, filed Feb. 24, 2003, now U.S. Pat. No. 6,902,180.

TECHNICAL FIELD

The present invention relates generally to flexible lines that are used to provide electricity and/or fluid under pressure from a tractor to a trailer and, more particularly, the present invention relates to a system for individually guiding and supporting one or more of the flexible lines.

BACKGROUND ART

In conventional tractor-trailer type vehicle arrangements, air hoses and/or electrical cables are provided which are adapted to be releasably coupled with the tractor and the trailer for operating and controlling various trailer components such as brakes and lights. For example, a typical arrangement includes two air hoses for conveying air from the cab to the brakes of the trailer and an electrical cable for interconnecting the respective electrical systems of the cab and trailer vehicles. Such hoses and cables are required to be of sufficient length to accommodate articulation of the tractor and trailer as the truck turns or travels over hills. As such, the hoses and cables have substantial slack portions when the vehicles are aligned.

The slack portions are typically taken up in large loops that flatten out as the slack is taken out of the hoses and cables when the tractor and trailer articulate or flex with respect to each other. Referring to FIG. 1A, means have been provided for supporting the hoses A and cable B in their looped configurations and to prevent damage to the hoses A and cable B by abrasion or tangling with other parts of the tractor and/or the trailer. Typically, the two air brake hoses along with the trailer cable positioned between the air brake hoses are restrained by a single three position clamp C. The three position clamp is used to support the hoses and the cable. The three position clamp is held together with one or more threaded fasteners D.

One problem with using the three position clamp is that the trailer cable is often not placed in the clamp. The trailer cable may be omitted because it is often the last component to be added to the tractor before the tractor is put into service and may be forgotten. When tractors are shipped in a "piggy back" configuration the cable is often removed and stored within the cab to prevent theft or damage of the cable. Often times, the cable is not properly placed in the three position clamp after shipment. In addition, when a cable wears out the replacement cable is often not placed in the three position clamp. The replacement cable is often not placed in the three position clamp, because it is difficult to disconnect and reconnect the clamp and the tools used needed to disconnect and reconnect the clamp are not always available on the tractor. When the trailer cable is not secured in the three position clamp, the cable will sit on the deck of the tractor and will be damaged by abrasion.

An additional problem with the three position clamp arrangement is that the clamp does not provide sufficient freedom for movement of the cable. The restriction the three position clamp places on the cable may cause the cable to become knotted.

As a result, there is a need for an elongated line assembly that properly routes an elongated line from a tractor to a trailer and is easy to detach and connect to structure on the tractor that supports the line. There is also a need for a line assembly that is free to swivel with respect to an attachment point to prevent the line from being knotted. Further, there is a need for a replacement line assembly that includes clamps connected to the line at predefined locations. Such a line assembly eases replacement of a worn or damaged line.

DISCLOSURE OF THE INVENTION

The present invention relates to an elongated line routing system for of an over the highway tractor. The system properly routes an elongated line, such as an air hose or an electrical cable, and supports the elongated line above a frame or deck of the tractor, preventing damage to the line by abrasion. The system includes an elongated line having first and second hooks and a support with first and second mounting points or rings. The first releasable hook is latched onto the first mounting point and the second releasable hook is latched onto the second mounting point to route the elongated line and support the elongated line above the frame of the tractor.

In one embodiment, an electrical trailer cable has a first connector that mates with the electrical socket on the tractor and a second connector that mates with an electrical socket on a trailer. The first and second releasable hooks are connected to the cable along the length of the cable. The first and second hooks are secured to mounting points on the tractor to properly route the cable when the second connector is connected to the trailer and when the second connector is not connected to a trailer.

In one embodiment, the electrical trailer cable is supported by an elongated cable support, often referred to as a pogo stick. In this embodiment, the first releasable hook is spaced apart from the first connector and the second releasable hook is between the first releasable hook and the second connector. The first hook is connected to a ring positioned along the length of the elongated cable support. The second hook is connected to a second ring that on an end portion of the elongated cable support. The first and second hooks route the electrical trailer cable from the socket on the tractor to the elongated cable support, along a length of the elongated cable support, to an end portion of the elongated cable support. A receptacle may be mounted to the elongated cable support for holding the second connector when the second connector is not connected to the socket on the trailer.

In one embodiment, the support is defined by an attachment point on the tractor cab and a spring that hangs from the cab. In this embodiment, the first hook is latched onto a ring on the back side of the cab and the second hook latches onto a ring on the end portion of the spring. The first and second hooks route the elongated line from the connector on the tractor, to the ring on the cab, to the end portion of the spring. A receptacle may be mounted to the cab for holding a second mating connector when the second mating connector is not connected to the socket on the trailer.

In one method of routing an elongated line of an over the highway tractor a first mating connector of the elongated line is plugged into a connector of the tractor. A first portion of the elongated line is routed to a first mounting point located along the length of an elongated cable support. A first hook on the elongated line is connected to the first mounting point. A second portion of the elongated line is routed from the first mounting point to a second mounting point located at an end portion of the elongated cable support. A second hook on the elongated line is connected to the second mounting point.

In one method of routing an elongated line of an over the highway tractor a first mating connector of the elongated line is plugged into a connector of the tractor. A first portion of the elongated line is routed to a position first mounting point located on a rear surface of the cab of the tractor. A first hook on the elongated line is connected to the first mounting point. A second portion of the elongated line is routed from the first mounting point to a second mounting point located at an end portion of the spring. A second hook on the elongated line is connected to the second mounting point.

Additional features of the invention will become apparent and a fuller understanding obtained by reading the following detailed description in connection with the accompanying drawings.

BRIEF DESCRIPTION OF DRAWINGS

FIG. 1A is a perspective view of a prior art three position clamp holding two air lines and an electrical cable;

FIG. 3 is a perspective view of an electrical cable connected to an elongated cable support by first and second hooks;

FIG. 4 is a side elevational view of an electrical cable connected to an elongated cable support by first and second hooks;

BEST MODE FOR CARRYING OUT THE INVENTION

Figure 1:
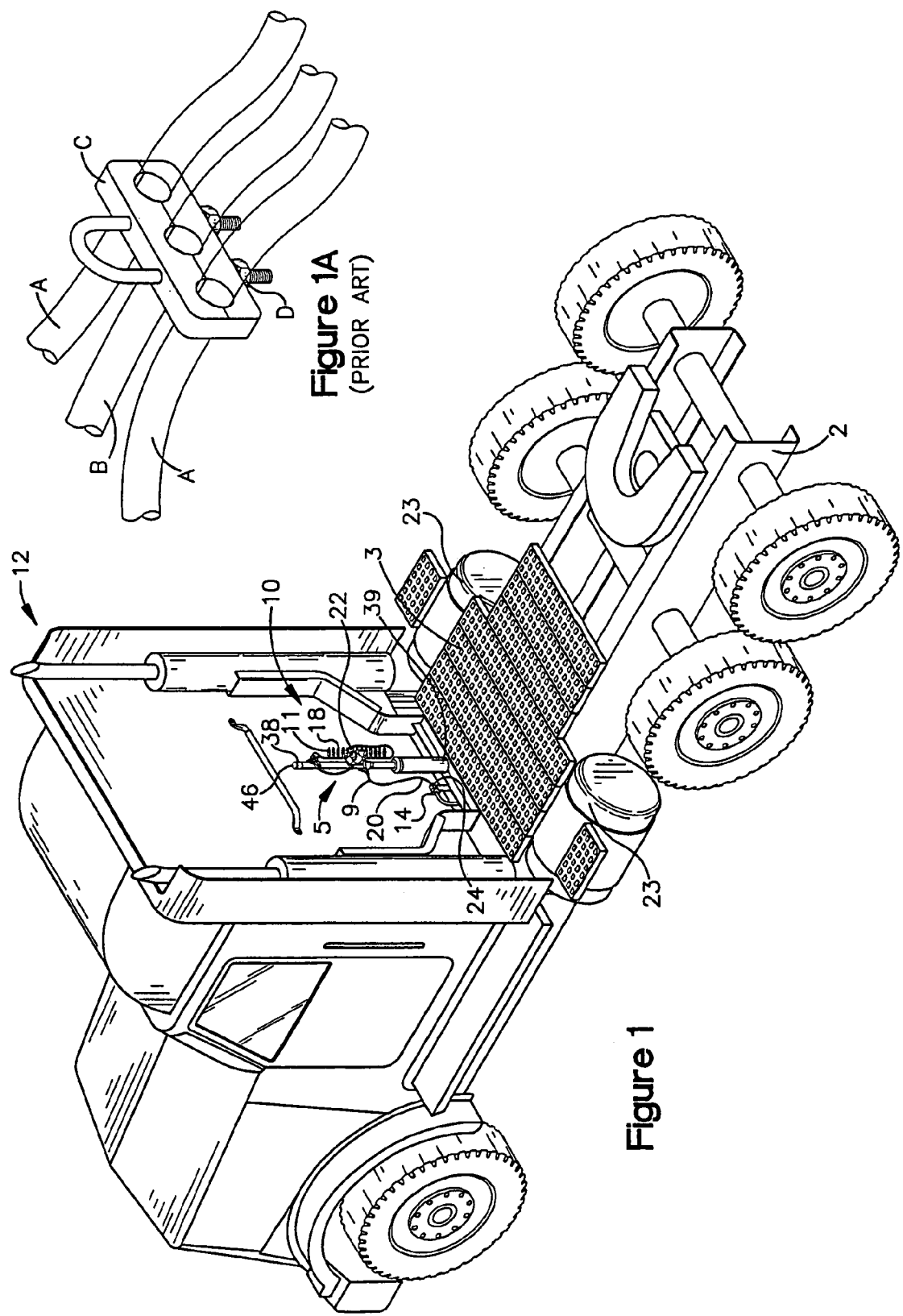
FIG. 1 is a perspective view of a tractor with an electrical cable assembly.

The present invention concerns a system 10 for properly routing an elongated line 18, such as an air hose or an electrical cable. The system supports one or more lines 18 above a frame 2 or deck 3 of a tractor 12 to prevent damage to the line by abrasion and to prevent tangling of the lines. The system 10 includes a support 5 with first and second mounting points 34, 36. First and second releasable hooks 30, 32 are connected to the elongated line 18. In the exemplary embodiment, each hook is connected to only one elongated line. The hooks are latched to the mounting points 34, 36 to route the elongated line and support the elongated line above the frame of the tractor.

In the illustrated embodiment, the elongated line 18 is an electrical cable. It should be readily apparent that the illustrated elongated line could also represent an air hose. Although the three elongated lines (1 electrical cable and two air hoses) are typically used, only one elongated line is shown to simplify the drawings. In the exemplary embodiment, the electrical cable and the air hoses are each supported by the releasable hooks 30, 32. However, the electrical cable could be supported by releasable hooks 30, 32 and the air hoses could be supported by the existing three position clamp.

The tractor 12 includes one or more connectors 14 for powering a component of a trailer 16. In the illustrated embodiments, the connector 14 is an electrical socket. The elongated line 18 has first and second ends 20, 22. A first mating connector 24 that mates with the connector 14 of the tractor is included on the first end 20 of the cable. A second mating connector 26 that mates with a connector 28 on the trailer is included on the second end 22 of the line. In the illustrated embodiment, the connector 28 is an electrical socket. A first releasable hook 30 is secured to the line 18 spaced apart from the first connector 24. A second releasable hook 32 is secured to the line 18 between the first releasable hook 30 and the second connector 26. In the illustrated embodiment, the first and second mounting points 34, 36 are rings supported by the tractor 12. The first hook 30 is releasably latched onto the first mounting point 34 and the second hook 32 is releasably latched onto the second mounting point 36. The connections of the first hook to the first mounting point and the second hook to the second mounting point properly route the elongated line 18.

The illustrated electrical cable is a standard sized seven wire tractor trailer cable. The illustrated cable includes a relatively straight (i.e. not coiled) segment 9 and a coiled segment 11. Suitable cables are constructed with various lengths and configurations, but usually have a twelve foot effective length or a fifteen foot effective length depending on the application. In the exemplary embodiment, the relatively straight segment 9 is approximately forty-eight inches long.

Figure 8:
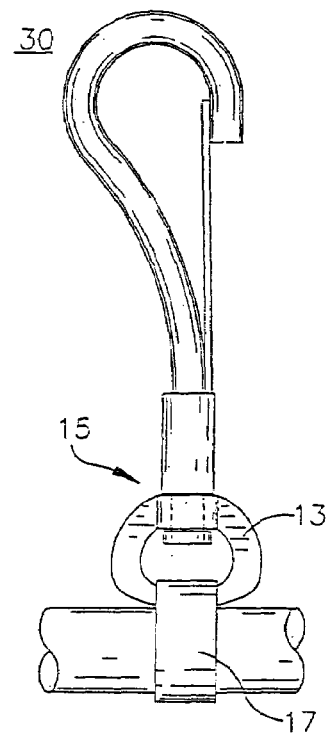
FIG. 8 is a perspective view of a spring hook.
Figure 9:
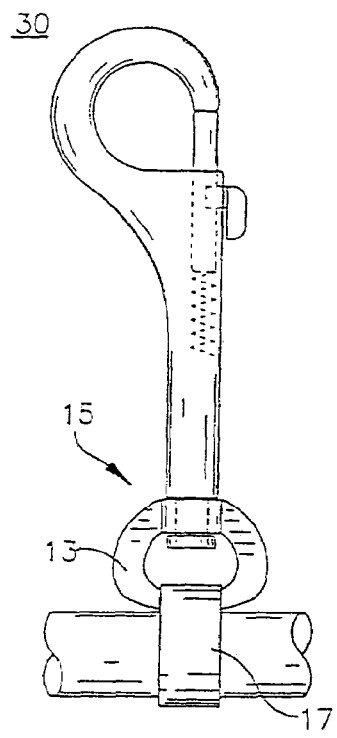
FIG. 9 is a perspective view of a slide bolt snap hook.

The hook 30 illustrated in FIG. 8, is a snap hook, sometimes referred to as chain connection spring clip. Snap hooks are often used on a dog leash. The hook 30 illustrated in FIG. 9 is a spring hook that has a slide bolt that is biased to a closed position by a spring. Snap hooks or spring hooks could be used. It should be readily apparent that other types of hooks could also be used. Referring to FIGS. 8 and 9, the fastening eye 13 is connected to the hook 30 by a swivel 15 that allows the fastening eye to rotate with respect to the hook. The hook 30 is connected to the segment 9 of the line by a plastic cable tie 17 or strap in the exemplary embodiment. The cable tie passes through the fastening eye and is snugly secured around the line 18. The swivel 15 allows the hook 30 to rotate freely with respect to the line 18.

The locations of the first and second mounting points 34,36 on the tractor and the hooks 30, 32 on the line are selected to maintain the line 18 at a safe and reasonably high distance above the tractor frame 2, a fuel tank top 23, and back of cab access deck plates 3. In one embodiment, the first hook 30 is connected to the line 18 at approximately twenty-four inches from the line end 20 and the second hook is connected at approximately forty-eight inches from the line end 20.

Figure 2:
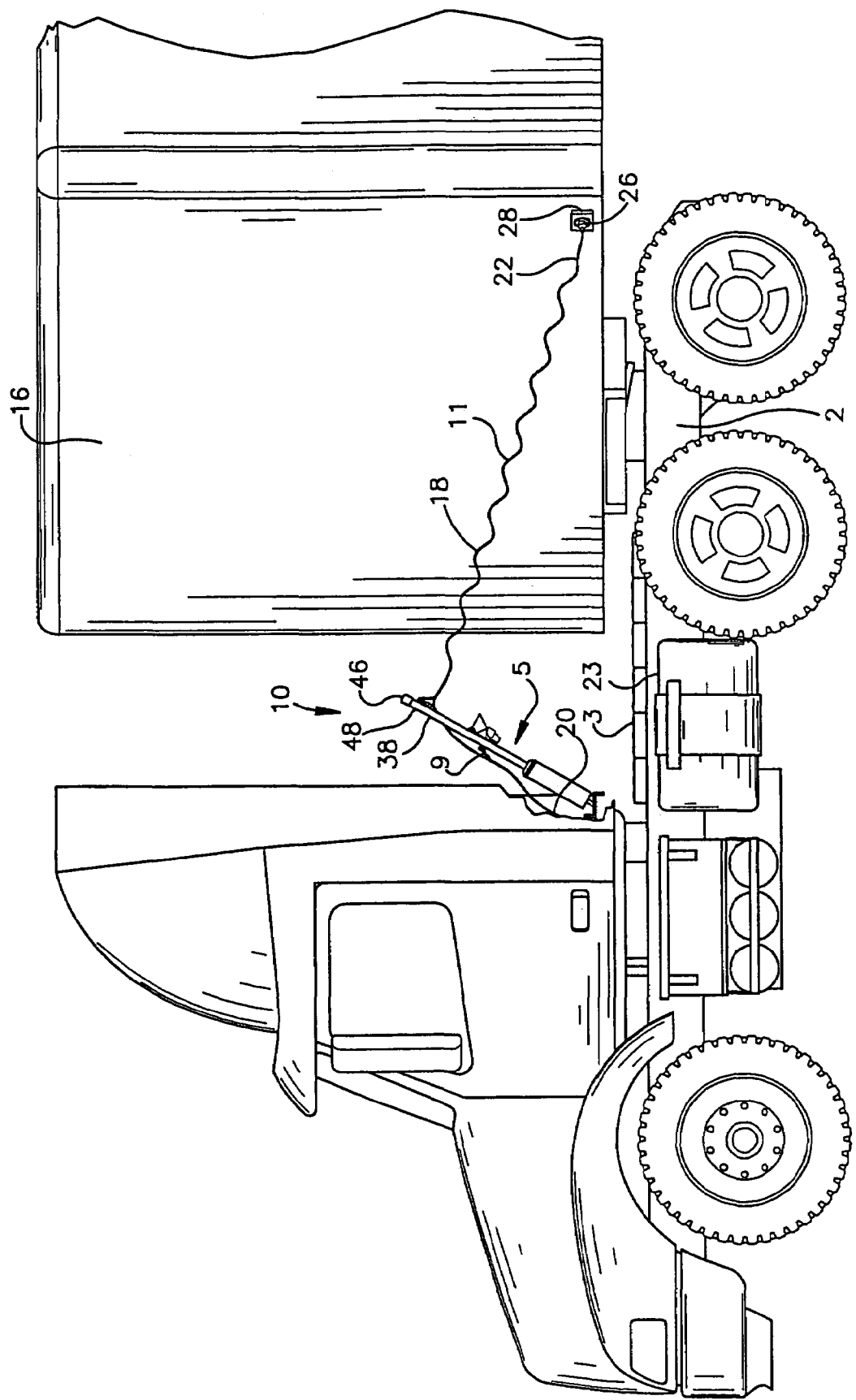
FIG. 2 is a side elevational view of a cable assembly connected to an articulated tractor and trailer.

FIGS. 1–4 illustrate an embodiment of the system 10 supporting an electrical cable. In this embodiment, the system utilizes an elongated line or cable support 38 to properly route the electrical cable. Suitable elongated line supports are often referred to as pogo sticks. The elongated line support is mounted away from the cab and is on the vehicle centerline in the exemplary embodiment. One acceptable elongated line support 38 is forty-eight inches tall and is mounted to the frame. The illustrated elongated line support 38 includes a spring portion 40 and an elongated post 42. The spring portion 40 is secured to the deck 3 of the tractor. The spring portion 40 biases the elongated line support to the upright position illustrated by FIG. 1. Referring to FIG. 2, the spring portion also allows the elongated line support to tilt in any direction. In FIG. 2, the elongated line support 38 is pulled toward the trailer 16 by the electrical cable plugged into the connector 28 of the trailer.

Referring to FIG. 1, the connector 28 is located in close proximity to a base 39 of the elongated line support. Referring to FIG. 3, first mounting point 34 is a ring connected to a lower portion of the elongated post 42 between the spring portion 40 and an end 46 of the elongated post 42. The first mounting point 34 is approximately twenty-four inches away from the connector 28. The second mounting point 36 is a ring connected to an end portion 48 of the post 42 near the end 46. In the exemplary embodiment, the second mounting point is positioned within three inches of the end 46 of the post. In the embodiment illustrated by FIGS. 1–4, the first and second rings are defined by eyes 50 of eye bolts 52. A bracket connected to the elongated line support that includes a hole for connection of a hook could be used as the first and/or second mounting points. Referring to FIGS. 3 and 4 a receptacle 54 is mounted to the elongated line support for holding the second connector 26 when the second connector is not connected to the connector 28 on the trailer.

In the embodiment illustrated by FIGS. 1–4, the first releasable hook 30 is latched onto the first ring and the second releasable hook 32 is latched onto the second ring. The first and second hooks and said first and second rings route the electrical trailer cable from the socket 24 on the tractor to 9 lower portion 49 of the elongated post, along the length of the elongated post, to the end portion 48 of the elongated post. FIG. 2 illustrates the trailer cable extended from the end portion 48 of the elongated post to the socket 28 on the trailer. FIGS. 3 and 4 illustrate the second connector 26 held in the receptacle 54. The cable is neatly routed between the second ring and the receptacle 54.

Figure 5:
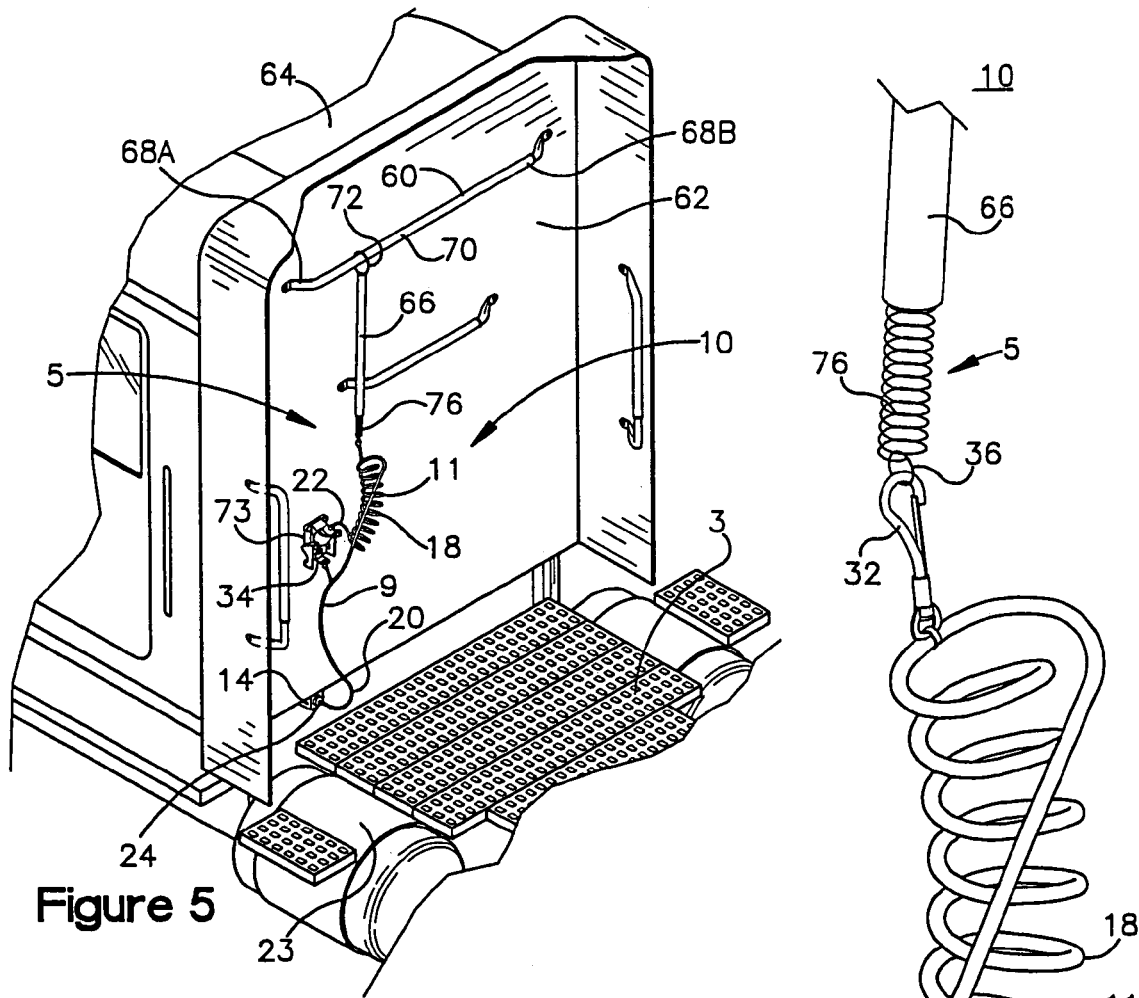
FIG. 5 is a partial perspective view of a tractor with an electrical cable assembly.
Figure 6:
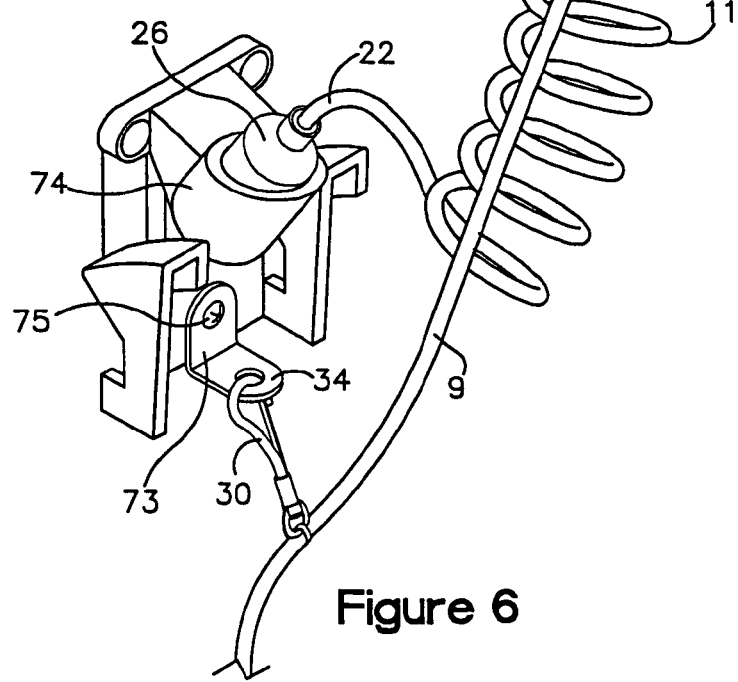
FIG. 6 is a perspective view of an electrical cable connected to a bracket by a first hook and a spring by a second hook.
Figure 7:
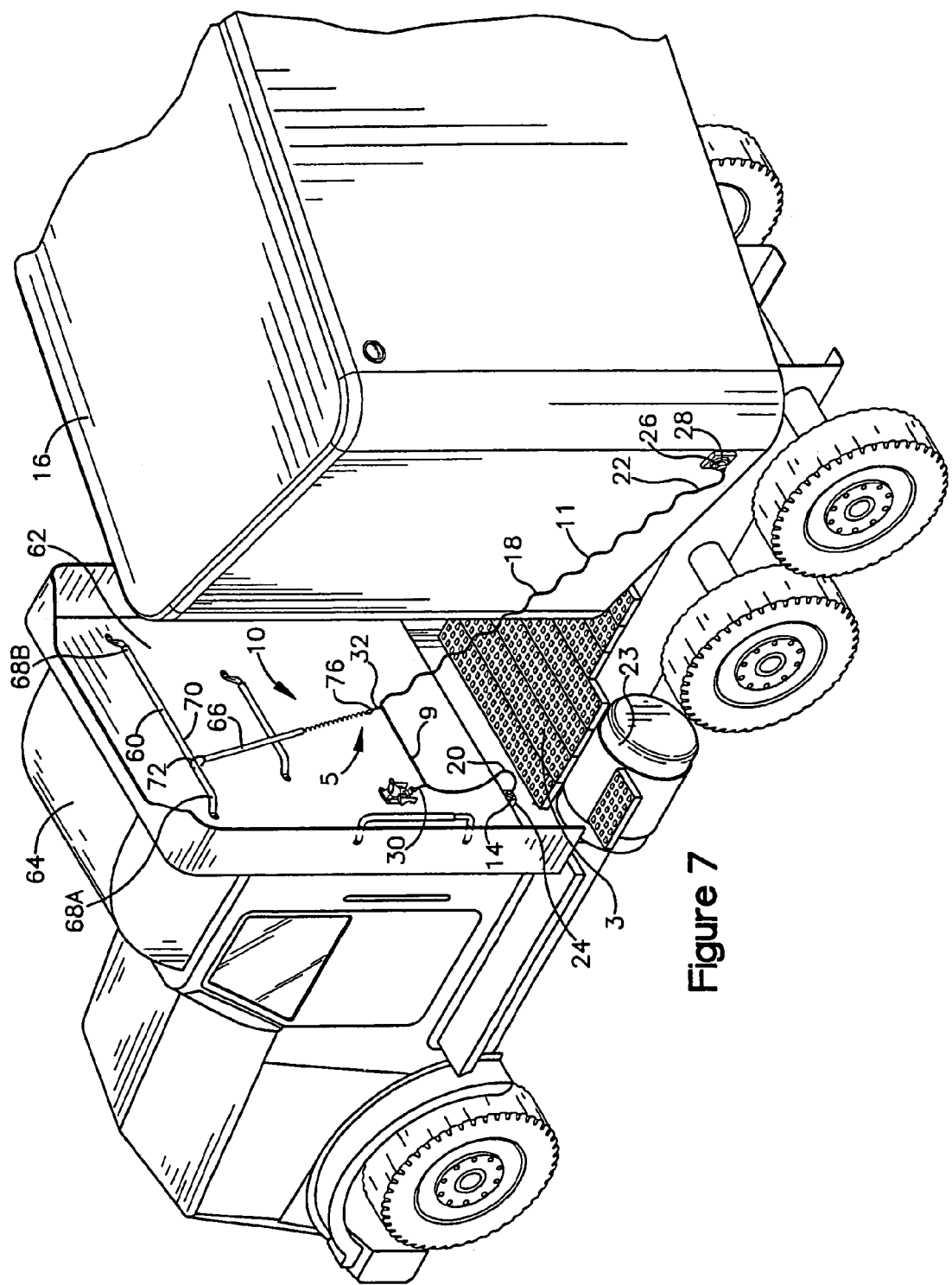
FIG. 7 is a side elevational view of a cable assembly connected to an articulated tractor and trailer.

FIGS. 5–7 illustrate another embodiment of the system 10 supporting an electrical cable. In this embodiment, the system 10 utilizes a bar 60 connected to a back side 62 of a cab 64 and a spring 66 connected to the bar 60 to properly route the electrical cable. The illustrated bar 60 includes two bent end portions 68A,68B that are connected to the back side 62 of the cab such that an elongated middle portion 70 is spaced away from the back side 62 of the cab. The illustrated spring 66 includes a first loop 72, sometimes referred to as a "bull ring," that is disposed around the bar 60 to connect the spring 66 to the bar 60. The spring is free to slide along the length of the bar. FIG. 5 illustrates the spring 66 in an unextended position. Referring to FIG. 7, the spring 66 may also be pulled in any direction away from the cab. In FIG. 7 the spring 66 is pulled toward the trailer 16 by the electrical cable plugged into the socket 28 of the trailer.

Figure 6A:
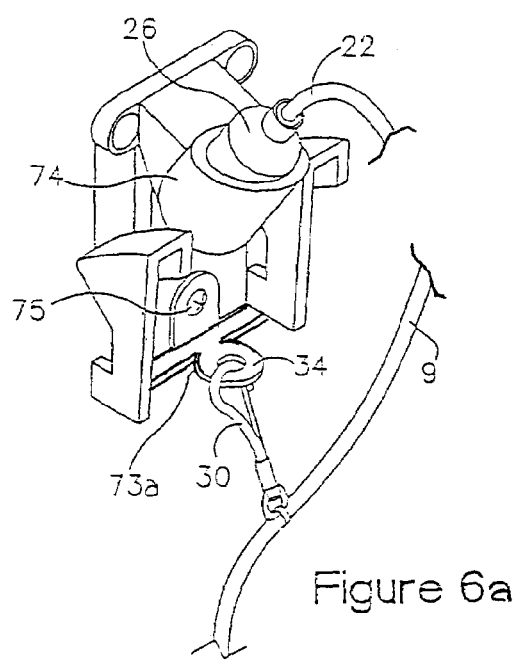
FIG. 6a is a perspective view of an alternative embodiment of FIG. 6, in which the electrical cable is connected to a ring by the first hook.
Figure 6B:
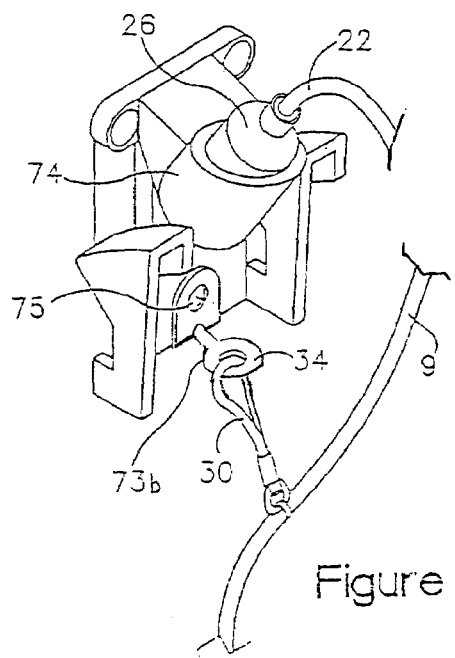
FIG. 6b is a perspective view of another alternative embodiment of FIG. 6, in which the electrical cable is connected to an eye-hook by the first hook.

Referring to FIGS. 5 and 7, the socket 14 is below the cab 64. Referring to FIGS. 5 and 6, the first mounting point 34 is a bracket 73 connected to a receptacle 74 that holds the second connector when the second connector is not connected to the trailer. The receptacle 74 is connected to the back side 62 of the cab 64. In the illustrated embodiment, the fastener 75 that holds the receptacle 74 to the cab also secures the bracket 73. The bracket 73 includes a hole for attachment of the hook 30. The bracket 73 is positioned about twenty-four inches from the connector 14 in the exemplary embodiment. The location shown in FIG. 5 provides a vertical climb to the line away from all frame surface obstructions and is a good egress for routing of the line toward the trailer connection. A second mounting point 36 is a ring formed or connected to a second end 76 of the spring 66. It should be readily apparent that other structure, such as a ring 73a or eye molded or cast in the receptacle 74, as illustrated in FIG. 6a, or an eye bolt 73b, as illustrated in FIG. 6b, could be used as the first mounting point. Referring to FIGS. 5 and 6, the receptacle is mounted to the back side of the cab for holding the second connector 26 when the second connector is not connected to the socket 28 on the trailer.

In the embodiment illustrated by FIGS. 5–7, the first releasable hook 30 is latched onto the first mounting point and the second releasable hook 32 is latched onto the second mounting point. The first and second hooks and said first and second mounting points route the electrical trailer cable from the first socket 24 to the first mounting point on the cab, to the mounting point 76 on the end of the spring. FIG. 7 illustrates the trailer cable extended from the end of the spring to the socket 28 on the trailer. FIGS. 5 and 6 illustrate the second connector 26 held in the receptacle 74. The cable is neatly routed between the second ring and the receptacle.

The line 18 illustrated by the drawings is an electrical cable. It should be readily apparent the system 10 could be used to route and support air hoses that supply air under pressure to the brakes of the trailer. The air brake hoses would also be equipped with two hooks that are used to position the hoses.

The disclosed line assembly 10 provides for quick and easy installation of trailer lines, such as hoses and cables, with planned routing for consistent quality and safety. Fastening of the cable is quick due to the prepositioned hooks on the elongated line and connection points on the tractor. The assembly 10 positions the cables up and away from the feet of the driver when the driver needs to access the back of the vehicle between the cab and the trailer. The assembly 10 also provides for quick and easy serviceability or replacement of the line assembly, since a replacement line assembly 10 includes the hooks 30, 32 at the proper position on the line. The swivel feature of the hooks provides for freedom of movement of the cable which helps eliminate chafing and knotting.

I claim:

1. In an over the highway tractor having an electrical socket for powering an electrical component of a trailer, a bar connected to a back side of a cab of the tractor, a spring connected to the bar, and an electrical trailer cable having a first connector that mates with said electrical socket and a second connector that mates with a socket on a trailer, said electrical trailer cable being supported by said spring, a system for routing the cable, comprising:
  a) a first releasable hook secured to the electrical trailer cable spaced apart from said first connector;
  b) a second releasable hook secured to the electrical trailer cable between said first releasable hook and said second connector;
  c) a first mounting point on a back side of a cab of said tractor, said first releasable hook being latchable onto said first ring mounting point;
  d) a second mounting point on an end portion of said spring said second releasable hook being latchable onto said second mounting point, said first and second hooks and said first and second mounting points route said electrical trailer cable from said socket to said first mounting point on said cab, to an end portion of said spring.

2. The system of claim 1 wherein said second mounting point is defined by a loop formed at an end of said spring.

3. The system of claim 1 wherein said first mounting point is defined by a bracket having an opening.

4. The system of claim 1 wherein said first mounting point is defined by an end portion of an eye bolt.

5. The system of claim 1 further comprising a receptacle mounted to said cab for holding said second connector when said second connector is not connected to said socket on said trailer.

6. The system of claim 1 further comprising a swivel structure interposed between said first hook and said cable that allows said hook to rotate with respect to said cable.

7. The system of claim 1 wherein said first hook includes a spring mechanism that biases said hook to a closed condition.

8. The system of claim 1 wherein said first mounting point is defined by a ring.

* * * * *